Dec. 20, 1932.                  E. J. BOWLEY                    1,891,520
                    METHOD OF COLORING CELLULOSIC PLASTICS
                            Filed March 12, 1930
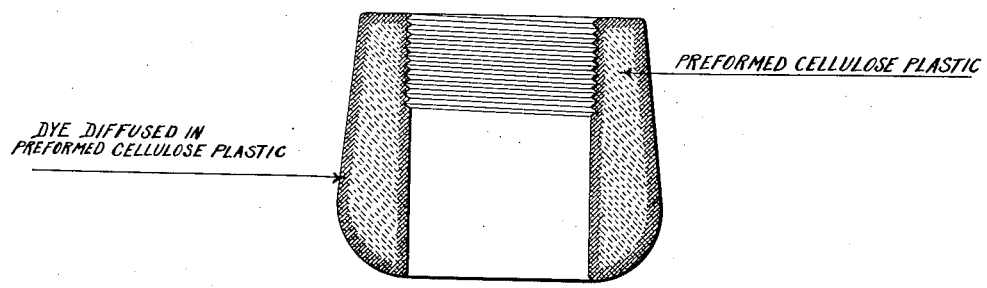
                                                    INVENTOR.
                                               Edward J. Bowley,
                                            BY
                                                    ATTORNEY.

Patented Dec. 20, 1932

1,891,520

UNITED STATES PATENT OFFICE

EDWARD J. BOWLEY, OF NEWARK, NEW JERSEY, ASSIGNOR TO RUBBER & CELLULOID PRODUCTS CO., OF NEWARK, NEW JERSEY, A CORPORATION OF NEW JERSEY

METHOD OF COLORING CELLULOSIC PLASTICS

Application filed March 12, 1930. Serial No. 435,178.

The present invention relates, generally, to cellulosic plastics and the invention has reference, more particularly, to a novel method of coloring cellulosic plastics, and also the resultant product of the method.

Heretofore, in order to impart colored effects to objects composed of cellulosic plastics it has been generally necessary to either intermix pigments with the cellulosic plastics during their manufacture or else to add the desired color in the form of alcoholic solutions of spirit soluble dyes during such manufacture. Objects so colored have dull surfaces which must be highly buffed to obtain a polished surface, when such is desired. Plastics colored by the use of pigments can hardly be given a lustrous appearance owing to the dullness of the pigments and their mere mechanical suspension in the plastics. In some instances, articles made from cellulosic plastics have been colored by spraying the same with colored lacquers or by immersion in alcoholic or aqueous solutions of dyes, but such coloring is extremely superficial and is readily marred or ruined by wear or abrasion. Such superficial coloring can only be satisfactorily used for cheap articles of short life duration.

The principal object of the present invention is to provide a method for coloring objects composed of cellulosic plastics such as pyroxylin plastic or celluloid, ethyl cellulosic plastic, cellulose acetate plastic and benzyl cellulose plastic, which method will cause the color to penetrate the objects as deeply as desired, which coloring will effect a permanent and fast color of any desired shade; the colors of said objects being thus substantially unaffected by wear or abrasion.

Another object of the present invention is to provide a method for coloring objects composed of cellulosic plastics which will cause the surfaces of the objects to have a highly lustrous and attractive appearance.

A further object of the present invention lies in the provision of a method for coloring objects composed of cellulosic plastics which is simple in its nature, and which may be applied directly to objects which have been completely fabricated as to form.

Still another object of the present invention is to provide a cellulosic plastic colored object or product wherein the coloring agency is diffused uniformly into the mass of cellulosic plastic so that the surfaces and the immediately underlying portions of the objects are uniformly colored.

The present invention contemplates a method by means of which a cellulosic plastic article may be so treated with an oil soluble dye dissolved in a suitable solvent medium that is absorbable in the cellulosic plastic so as to produce a colored surface portion or layer of desired thickness and color concentration having the dye uniformly dispersed and suspended permanently therein. It is apparent that the method of this invention may be applied to the entire range of cellulosic plastic products useful in the arts, examples of which are brush ferrules and handles, umbrella handles, toilet articles, novelties and in fact, any article made of cellulosic plastic material desired to be given color characteristics.

Other objects of this invention, not at this time more particularly enumerated, will be clearly understood from the following detailed description of the same.

The invention is clearly illustrated in the accompanying drawing, in which:—

The single figure is a sectional view of an object colored by the method of this invention.

According to the present invention, a method is contemplated wherein a normally powdered oil soluble dye, or dyes such, for example, as an anthraquinone dye, is dissolved in a predetermined quantity of suitable solvent vehicle which may preferably be an ester or combination of esters. It has been found that butyl acetate serves as a very satisfactory solvent and especially where the article to be treated is made of a pyroxylin plastic, but it is to be understood that this invention is not limited to the use of any one ester for any ester may be employed which has the general formula R-O-R', R-O-AR', AR-O-R', or AR-O-AR', where R is an alkyl radical, R' is an acyl radical, AR is an aryl radical and AR' is the radical of an aromatic acid, for example, ethyl acetate, amyl acetate or propyl acetate. It will also be understood that solvents comprising mixtures of an ester or esters with ether or ethers may be employed; and in some instances, as for example, when the cellulose plastic treated is cellulose acetate, ethers alone may be employed as the solvent ingredient of the dye solution. After the dye has been completely dissolved in the solvent, the cellulosic plastic article or object to be dyed is immersed or dipped into the dye solution and allowed to remain therein for a period depending upon the depth of color penetration desired. The immersed article is then removed from the solution and caused to dry either in the air or artificially.

Without restricting the invention to details, the following is given as an example of the method of this invention using anthraquinone dye and butyl acetate. One hundred cubic centimeters of normal liquid butyl acetate is placed in a container and into this solvent is added fifty milligrams of an oil soluble anthraquinone dye in powdered form. The dye is thoroughly stirred into the butyl acetate until completely dissolved therein. The resulting solution is now ready to receive the cellulosic plastic object to be colored. This object or article may be, and usually is, completely fabricated as to form and ordinarily would have the color characteristic of the particular cellulosic plastic of which it is made.

The article is dipped or immersed into the dye solution for a period varying from a few seconds to several minutes. The longer the article is immersed in the dye solution, the deeper will the color penetrate into the body of the article. When the article is dipped into the dye solution, the butyl acetate rapidly diffuses into the surface portion or layers of the cellulosic plastic of which the article is made. The dye is carried along with the butyl acetate and is uniformly distributed into the mass of the article, the depth to which the butyl acetate diffuses and consequently the thickness of the resulting dyed layer of cellulosic plastic depending upon the period of immersion. In practice, it has been found that a period of immersion of from 5 to 15 seconds is usually ample in treating many articles since the dye in this period ordinarily penetrates sufficiently into the body of the article to provide a color penetrated area or layer of substantial thickness, which will withstand wear and more or less abrasion without appreciable change. The article is then removed from the dye solution and allowed to dry either in the open air or in suitable drying ovens. If allowed to dry in the open air the article will dry completely in about a half hour or less.

In drying, the butyl acetate evaporates from the surface of the article leaving the dye uniformly dispersed or disseminated throughout the surface layers thereof. Owing to the action of the butyl acetate in coagulating the minute colloidal surface particles of the cellulosic plastic, the surface of the article is smoother when removed from the dye solution than it was before dipping, and the same takes on a brilliant luster or gloss when removed from the dye solution and dried, eliminating necessity for buffing or polishing operations.

The single figure of the drawing shows the cross-sectional structure of a cellulosic plastic article after the same has been subjected to the method of this invention. The interior mass of the article, as indicated by the legend on the drawing, has been unaffected by the method and remains cellulosic plastic, whereas the surface layers of the article show diffused anthraquinone dye held in suspension by the cellulosic plastic.

The same dye solution may be used for coloring many articles and as the strength of the solution becomes weak more dye or butyl acetate may be added as found necessary. The anthraquinone dyes may be obtained in any color of the spectrum and any intermediate color may be obtained by intermixing various shades of the dyes.

It is not intended to limit the invention to the relative proportions of dye and solvent mentioned, inasmuch as wide variations from these proportions may be made to obtain varying color concentrations.

Although anthraquinone dyes alone have been mentioned as usable in carrying out the method of this invention it is to be understood that the invention is not limited to the use of such dyes alone but that other suitable oil soluble dyes may be used, for example, azo dyes may be used in lieu of the anthraquinone dyes or mixtures of anthraquinone and azo dyes may be employed. Also, solvents other than esters may be used, such as, ethylene glycol monoethyl ether, ethylene glycol monomethyl ether, ethylene glycol monoethyl ether acetate, ethylene glycol monobutyl ether, diethylene glycol monobutyl ether and others.

The method of the present invention is highly valuable to those of the cellulosic plastic art who heretofore have been compelled to carry large stocks of various articles in many colors, thereby involving tremendous inventory costs. By using the method of the present invention, it is merely necessary to carry a single line of given articles in finished form and in the natural cellulosic plastic color, the same being subject to application of any desired color effect by the method of this invention, according to any given demand or order. Also, the method is equally applicable to seasoned as well as unseasoned cellulosic plastic.

It is to be understood that the steps above recited are given merely for the purpose of illustrating the invention and are not to be considered in a limiting sense. Many modifications will occur to those skilled in the art. It is intended to cover all such modifications that fall within the scope of the appended claims.

What is claimed is:—

1. The method of coloring an object composed of a cellulosic plastic which consists in dipping the object into a solution of an oil soluble dye in butyl acetate.

2. The method of coloring an object composed of a cellulosic plastic which consists in dissolving an azo dye in butyl acetate which will diffuse into the cellulosic plastic of which the object is made and then dipping the object into such dye solution for an appreciable period.

In testimony, that I claim the invention set forth above I have hereunto set my hand this 10th day of March, 1930.

EDWARD J. BOWLEY.